US008600107B2

(12) United States Patent
Holmgren

(10) Patent No.: US 8,600,107 B2
(45) Date of Patent: Dec. 3, 2013

(54) INTERACTIVE INPUT SYSTEM AND METHOD

(75) Inventor: David Holmgren, Calgary (CA)

(73) Assignee: SMART Technologies ULC (CA)

( * ) Notice: Subject to any disclaimer, the term of this patent is extended or adjusted under 35 U.S.C. 154(b) by 329 days.

(21) Appl. No.: 13/077,637

(22) Filed: Mar. 31, 2011

(65) Prior Publication Data
US 2012/0250936 A1 Oct. 4, 2012

(51) Int. Cl.
G06K 9/00 (2006.01)

(52) U.S. Cl.
USPC .......... 382/103; 382/100; 382/168; 382/276; 382/286; 382/291; 178/18.01; 178/18.09; 345/156; 345/173; 345/175; 715/700; 715/856; 715/862; 715/863

(58) Field of Classification Search
None
See application file for complete search history.

(56) References Cited

U.S. PATENT DOCUMENTS

| 5,218,299 | A | * | 6/1993 | Dunkel | 324/307 |
| 5,448,263 | A | | 9/1995 | Martin | |
| 5,452,367 | A | * | 9/1995 | Bick et al. | 382/128 |
| 6,128,414 | A | * | 10/2000 | Liu | 382/266 |
| 6,141,000 | A | | 10/2000 | Martin | |
| 6,337,681 | B1 | | 1/2002 | Martin | |
| 6,429,856 | B1 | * | 8/2002 | Omura et al. | 345/175 |
| 6,608,619 | B2 | * | 8/2003 | Omura et al. | 345/175 |
| 6,747,636 | B2 | | 6/2004 | Martin | |
| 6,803,906 | B1 | | 10/2004 | Morrison et al. | |
| 6,972,401 | B2 | | 12/2005 | Akitt et al. | |
| 7,015,894 | B2 | * | 3/2006 | Morohoshi | 345/156 |
| 7,232,986 | B2 | | 6/2007 | Worthington et al. | |
| 7,236,162 | B2 | | 6/2007 | Morrison et al. | |
| 7,274,356 | B2 | | 9/2007 | Ung et al. | |
| 2003/0006973 | A1 | * | 1/2003 | Omura et al. | 345/175 |
| 2003/0071858 | A1 | * | 4/2003 | Morohoshi | 345/856 |
| 2006/0235320 | A1 | * | 10/2006 | Tan et al. | 600/509 |
| 2007/0116333 | A1 | | 5/2007 | Dempski et al. | |
| 2008/0143690 | A1 | | 6/2008 | Jang et al. | |
| 2008/0291164 | A1 | | 11/2008 | Tanaka | |
| 2009/0277697 | A1 | | 11/2009 | Bolt et al. | |
| 2009/0278794 | A1 | * | 11/2009 | McReynolds et al. | 345/156 |
| 2009/0278795 | A1 | | 11/2009 | Hansen et al. | |
| 2010/0079385 | A1 | * | 4/2010 | Holmgren et al. | 345/173 |

(Continued)

FOREIGN PATENT DOCUMENTS

| WO | 2009/135313 A1 | 11/2009 |
| WO | 2011/003205 A1 | 1/2011 |
| WO | 2012/006716 A1 | 1/2012 |

OTHER PUBLICATIONS

Goodman et al. "Curve Fitting for Restoration of Accuracy for Overlapping Peaks in Gas Chromatography/Combustion Isotope Ratio Mass Spectrometry", 1994 Anal. Chem., vol. 66, pp. 1294-1301.*
Westerberg "Detection and Resolution of Overlapped Peaks for an On-Line Computer System for Gas Chromatographs", Nov. 1969, Analytical Chemistry, vol. 41, No. 13.*

(Continued)

Primary Examiner — Matthew Bella
Assistant Examiner — Jason Heidemann
(74) Attorney, Agent, or Firm — Katten Muchin Rosenman LLP

(57) ABSTRACT

A method of determining locations of at least two pointers in a captured image frame comprises generating a vertical intensity profile (VIP) from the captured image frame, the VIP comprising peaks generally corresponding to the at least two pointers; determining if the peaks are closely spaced and, if the peaks are closely spaced, fitting a curve to the VIP; analyzing the fitted curve to determine peak locations of the fitted curve; and registering the peak locations as the pointer locations.

20 Claims, 17 Drawing Sheets

(56) References Cited

U.S. PATENT DOCUMENTS

| | | |
|---|---|---|
| 2010/0201812 A1 | 8/2010 | McGibney |
| 2010/0313155 A1 | 12/2010 | Willekes et al. |
| 2011/0006981 A1 | 1/2011 | Chtchetinine et al. |
| 2011/0095989 A1* | 4/2011 | McGibney et al. ............ 345/173 |
| 2011/0221706 A1* | 9/2011 | McGibney et al. ............ 345/175 |
| 2011/0241984 A1* | 10/2011 | Morrison et al. ............. 345/157 |
| 2011/0242006 A1* | 10/2011 | Thompson et al. ........... 345/173 |
| 2012/0206344 A1* | 8/2012 | Hill et al. ..................... 345/157 |

OTHER PUBLICATIONS

Romanenko et al., "Resolution of the overlapping peaks in the case of linear sweep anodic stripping voltammetry via curve fitting", 2004, Chemometrics and Intelligent Laboratory Systems 73, pp. 7-13.*

Transmittal; International Search Report; and Written Opinion of the International Searching Authority for International Application No. PCT/CA2012/00028.

* cited by examiner

INTERACTIVE INPUT SYSTEM AND METHOD

FIELD OF THE INVENTION

The present invention relates generally to interactive input systems and in particular, to an interactive input system and method.

BACKGROUND OF THE INVENTION

Interactive input systems that allow users to inject input (i.e. digital ink, mouse events etc.) into an application program using an active pointer (e.g. a pointer that emits light, sound or other signal), a passive pointer (e.g. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the entire contents of which are incorporated herein by reference; touch systems comprising touch panels employing electromagnetic, capacitive, acoustic or other technologies to register pointer input; laptop and tablet personal computers (PCs); personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x, y) coordinates relative to the touch surface using triangulation. The pointer coordinates are conveyed to a computer executing one or more application programs. The computer uses the pointer location data to update the computer-generated image that is presented on the touch surface. Pointer contacts on the touch surface can therefore be recorded as writing or drawing or used to control execution of an application program executed by the computer.

In interactive input systems that employ machine vision technology to register pointer input, when only a single pointer exists in captured image frames, the location of the pointer in (x, y) coordinates relative to the touch surface can be readily computed using triangulation. However, when multiple pointers exist in captured image frames, computing the positions of the pointers in (x, y) coordinates relative to the touch surface is more complicated as pointer ambiguity and/or pointer occlusion conditions may exist. For example, when multiple pointers are contacting the input surfaces, there are positions where one pointer may partially or completely obscure another pointer from the view of an imaging device, giving rise to ambiguity as to the location of the pointers.

Several approaches for improving detection of multiple pointers in interactive input systems have been considered. For example, U.S. Patent Application Publication No. 2008/0143690 to Jang et al. discloses a display device comprising a plurality of cameras positioned at the corners of a touch surface. Each camera takes images of the touch surface, on which multiple touch locations are present. The image data are then sent to a signal processor of a control board. The signal processor detects the touch locations from the image data of the cameras and the angle of each touch location with respect to each camera and finds the coordinate of each touch location. During the calculation, the angle measured, which has been distorted by the lens of the camera is compensated by a look-up-table stored in the control board. Therefore, each location of multi-touch can be accurately detected.

U.S. Patent Application Publication No. 2007/0116333 to Dempski et al. discloses a system and method for determining positions of multiple targets on a touch surface. At least two cameras are positioned at the corners of the touch surface to acquire images of the multiple simultaneous targets on the touch surface. The information from the cameras is used to generate possible targets. The possible targets include both "real" targets (a target associated with an actual touch) and "ghost" targets (a target not associated with an actual touch). Using an analysis of tracking a history of previous targets, such as finding the distance and direction of a present target relative to its associated previous target, the real targets are found and the ghost targets are deleted from the list of the potential targets.

U.S. Patent Application Publication No. 2008/0291164 to Tanaka discloses a coordinate input apparatus for detecting multiple inputs. A plurality of sensor units for receiving arrival light detects the light-shielding ranges caused by pointers present on the coordinate input apparatus. The information of each end of the light-shielding ranges, such as the coordinate and the angle are calculated on the basis of the number of the ranges in the respective sensor units. An input transient state in which two light-shielding ranges are partially or totally overlapped is detected. True coordinative values of the pointers are finally determined based on a selection of a coordinate-calculation first data and a coordinate-calculation second data, which is angle information of the ends of the light-shielding ranges.

U.S. Patent Application Publication No. 2010/0201812 to McGibney et al. entitled "Active Display Feedback in Interactive Input Systems" filed on Feb. 11, 2009 and assigned to SMART Technologies, ULC, discloses a method for distinguishing a plurality of pointers in an interactive input system and an interactive input system employing the method. During the method, a plurality of potential coordinates for a plurality of pointers in proximity of an input surface is calculated. Visual indicators associated with each potential coordinate on the input surface are displayed and real pointer locations and imaginary pointer locations associated with each potential coordinate are determined from the visual indicators.

U.S. Patent Application Publication No. 2011/0006981 to Chtchetinine et al. entitled "Interactive Input System" filed on Jul. 10, 2009 and assigned to SMART Technologies, ULC, discloses an interactive input system and method for resolving ambiguities between at least two pointers in a plurality of input regions defining an input area. The method comprises capturing images of the plurality of input regions, the images captured by plurality of imaging devices each having a field of view of at least a portion of the input area, processing image data from the images to identify a plurality of targets for the at least two pointers within the input area and analyzing the plurality of targets to resolve a real location associated with each pointer.

Although the above-mentioned interactive input systems allow multiple pointer contacts to be determined, alternative methods to resolve multiple pointer contacts are desired. It is therefore an object of the present invention to provide a novel interactive input system and method.

SUMMARY OF THE INVENTION

Accordingly, in one aspect there is provided a method of determining locations of at least two pointers in a captured image frame, the method comprising: generating a vertical intensity profile (VIP) from the captured image frame, the VIP comprising peaks generally corresponding to the at least two pointers; determining if the peaks are closely spaced and, if the peaks are closely spaced: fitting a curve to the VIP; analyzing the fitted curve to determine peak locations of the fitted curve; and registering the peak locations as the pointer locations.

In one embodiment, if the peaks are determined not to be closely spaced, the method further comprises analyzing the VIP to determine the peak locations and registering the peak locations as the pointer locations. In one embodiment, the fitting comprises calculating a nonlinear least squares fit for at least one model, each model comprising at least two peaks, each peak having at least one of a respective peak location, a respective peak width and a respective peak amplitude. The nonlinear least squares fit may comprise any one of a conjugate gradient algorithm, a Levenberg-Marquardt algorithm, and a nonlinear simplex algorithm. In a related embodiment, the at least one model comprises a plurality of models, each model in the plurality comprising a different number of peaks. In a this case, the fitting may further comprise calculating a goodness-of-fit value for each model; calculating an Akaike Information Criterion (AIC) value for each model; and determining a final model by comparing the goodness-of-fit values and the AIC values, the final model being the fitted curve. The final model determined is the model having at least one of a lowest goodness-of-fit value and a lowest AIC value.

In one embodiment, the method further comprises, prior to the determining, comparing the VIP to a threshold; and identifying the peaks in the VIP based on the comparing.

In another aspect, there is provided an interactive input system, comprising: at least one imaging assembly capturing image frames of a region of interest; and processing structure in communication with the at least one imaging assembly, the processing structure being configured to: generate a vertical intensity profile (VIP) from a captured image frame, the VIP comprising peaks generally corresponding to locations of at least two pointers in the captured image frame; and determine if the peaks are closely spaced, and if the peaks are closely spaced: fit a curve to the VIP; analyze the fitted curve to determine peak locations of the fitted curve; register the peak locations as the pointer locations.

In another aspect, there is provided a non-transitory computer readable medium having embodied thereon a computer program for determining locations of at least two pointers in a captured image frame, the computer program comprising: program code for generating a vertical intensity profile (VIP) from the captured image frame, the VIP comprising peaks generally corresponding to the at least two pointers; and program code for determining if the peaks are closely spaced and, if the peaks are closely spaced: program code for fitting a curve to the VIP; program code for analyzing the fitted curve to determine peak locations of the fitted curve; and program code for registering the peak locations as the pointer locations.

BRIEF DESCRIPTION OF THE DRAWINGS

Embodiments will now be described more fully with reference to the accompanying drawings in which.

DETAILED DESCRIPTION OF THE EMBODIMENTS

Figure 1:
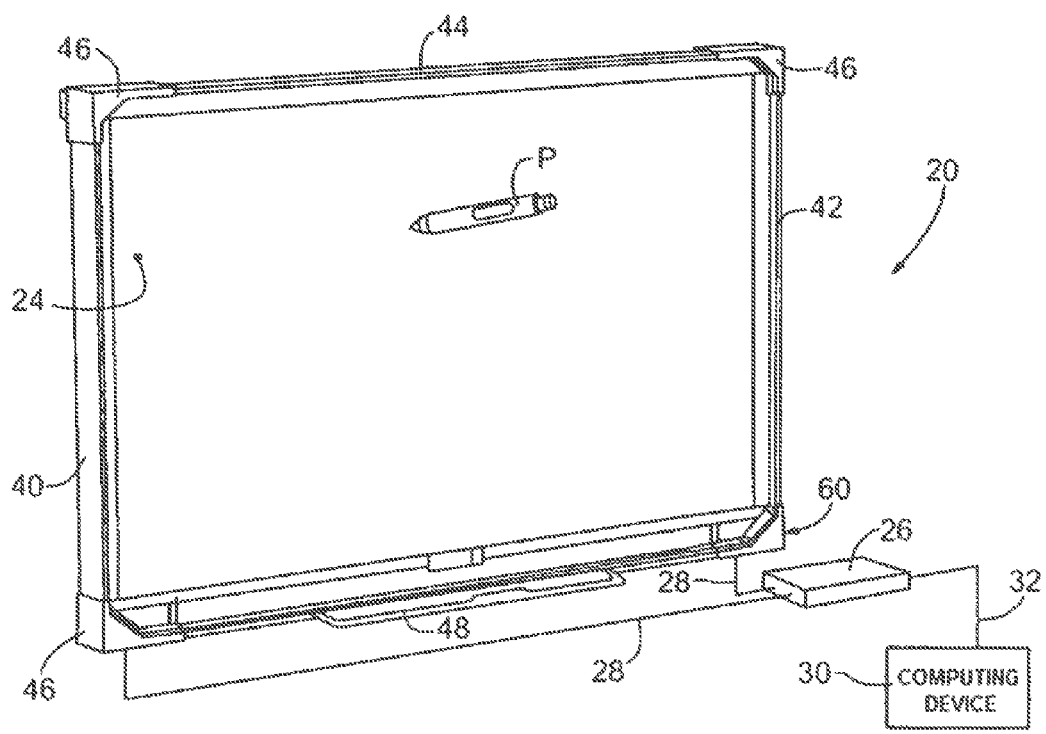
FIG. 1 is a perspective view of an interactive input system.
Figure 2:
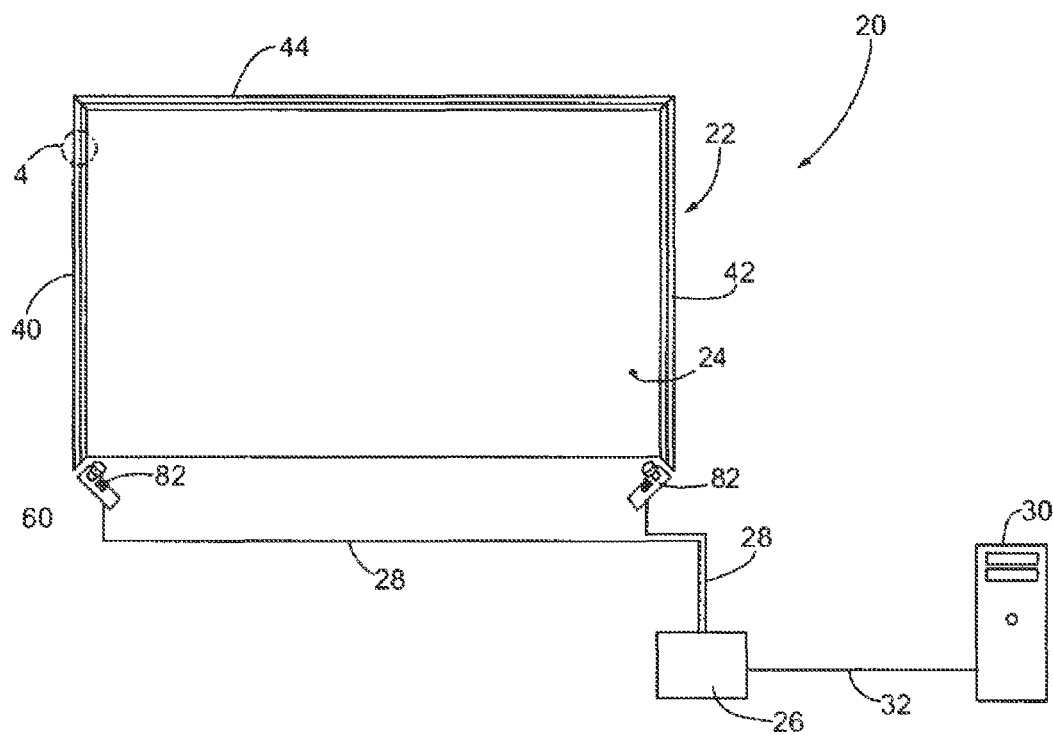
FIG. 2 is a schematic front elevational view of the interactive input system of FIG. 1.

Turning now to FIGS. 1 and 2, an interactive input system that allows a user to inject input such as digital ink, mouse events, commands etc. into an application program is shown and is generally identified by reference numeral 20. In this embodiment, interactive input system 20 comprises an assembly 22 that engages a display unit (not shown) such as for example, a plasma television, a liquid crystal display (LCD) device, a flat panel display device, a cathode ray tube etc. and surrounds the display surface 24 of the display unit. The assembly 22 employs machine vision to detect pointers brought into a region of interest in proximity with the display surface 24 and communicates with at least one digital signal processor (DSP) unit 26 via communication lines 28. The communication lines 28 may be embodied in a serial bus, a parallel bus, a universal serial bus (USB), an Ethernet connection or other suitable wired connection. The DSP unit 26 in turn communicates with a general purpose computing device 30 executing one or more application programs via a USB cable 32. Alternatively, the DSP unit 26 may communicate with the computing device 30 over another wired connection such as for example, a parallel bus, an RS-232 connection, an Ethernet connection etc. or may communicate with the computing device 30 over a wireless connection using a suitable wireless protocol such as for example Bluetooth, WiFi, ZigBee, ANT, IEEE 802.15.4l Z-Wave etc. Computing device 30 processes the output of the assembly 22 received via the DSP unit 26 and adjusts image data that is output to the display unit so that the image presented on the display surface 24 reflects pointer activity. In this manner, the assembly 22, DSP unit 26 and computing device 30 allow pointer activity proximate to the display surface 24 to be recorded as writing or drawing or used to control execution of one or more application programs executed by the computing device 30.

Assembly 22 comprises a frame assembly that is integral with or attached to the display unit and surrounds the display surface 24. Frame assembly comprises a bezel having three bezel segments 40 to 44, four corner pieces 46 and a tool tray segment 48. Bezel segments 40 and 42 extend along opposite side edges of the display surface 24 while bezel segment 44 extends along the top edge of the display surface 24. The tool tray segment 48 extends along the bottom edge of the display surface 24 and supports one or more pen tools P and an eraser tool (not shown). The corner pieces 46 adjacent the top left and top right corners of the display surface 24 couple the bezel segments 40 and 42 to the bezel segment 44. The corner pieces 46 adjacent the bottom left and bottom right corners of the display surface 24 couple the bezel segments 40 and 42 to the tool tray segment 48. In this embodiment, the corner pieces 46 adjacent the bottom left and bottom right corners of the display surface 24 accommodate imaging assemblies 60 that look generally across the entire display surface 24 from different vantages. The bezel segments 40 to 44 are oriented so that their inwardly facing surfaces are seen by the imaging assemblies 60.

Figure 3:
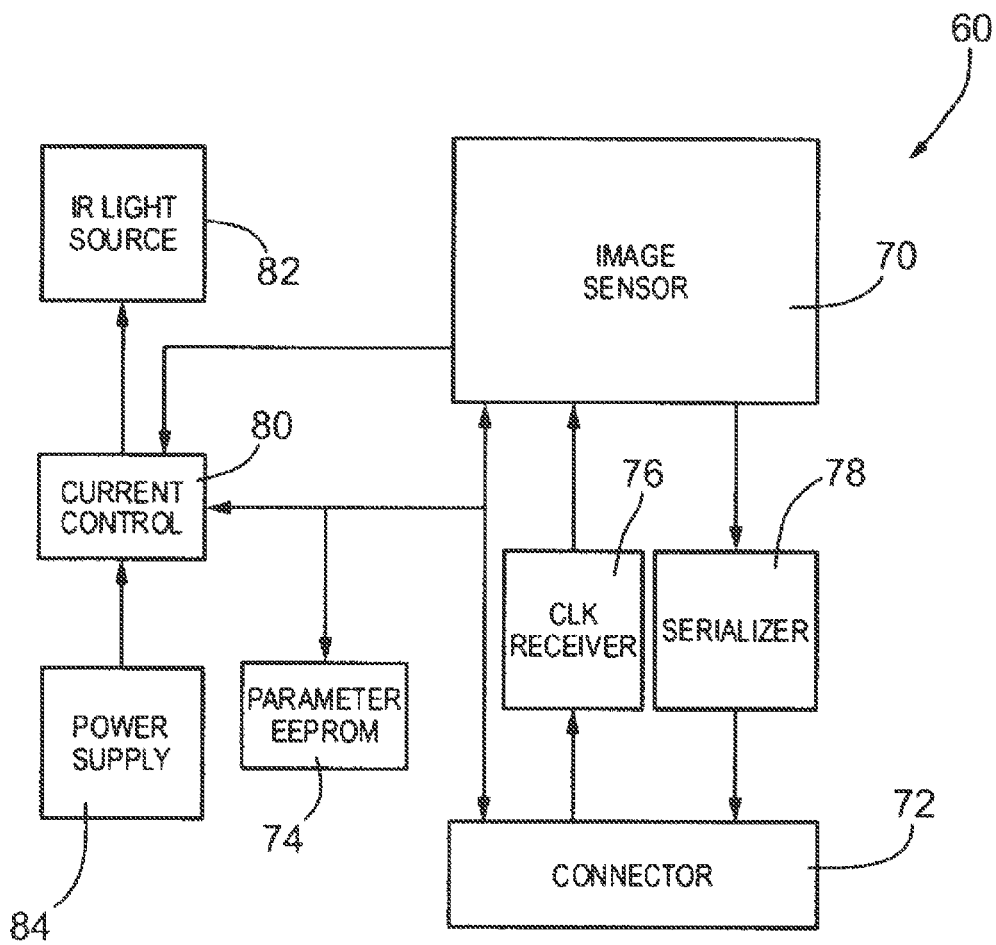
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Micron under model No. MT9V022 fitted with an 880 nm lens of the type manufactured by Boowon under model No. BW25B. The lens has an IR-pass/visible light blocking filter thereon (not shown) and provides the image sensor 70 with a 98 degree field of view so that the entire display surface 24 is seen by the image sensor 70. The image sensor 70 is connected to a connector 72 that receives one of the communication lines 28 via an I²C serial bus. The image sensor 70 is also connected to an electrically erasable programmable read only memory (EEPROM) 74 that stores image sensor calibration parameters as well as to a clock (CLK) receiver 76, a serializer 78 and a current control module 80. The clock receiver 76 and the serializer 78 are also connected to the connector 72. Current control module 80 is also connected to an infrared (IR) light source 82 comprising one or more IR light emitting diodes (LEDs) or other suitable radiation source(s) that provide illumination to the region of interest, a power supply 84 and the connector 72.

The clock receiver 76 and serializer 78 employ low voltage, differential signaling (LVDS) to enable high speed communications with the DSP unit 26 over inexpensive cabling. The clock receiver 76 receives timing information from the DSP unit 26 and provides clock signals to the image sensor 70 that determines the rate at which the image sensor 70 captures and outputs image frames. Each image frame output by the image sensor 70 is serialized by the serializer 78 and output to the DSP unit 26 via the connector 72 and communication lines 28.

Figure 4:
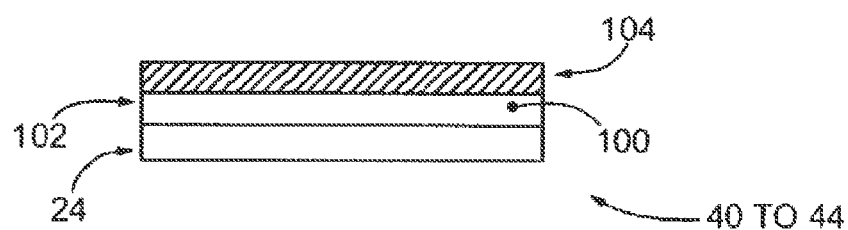
FIG. 4 is a front elevational view of a portion of a bezel segment forming part of the interactive input system of FIG. 1.

FIG. 4 shows a portion of the inwardly facing surface 100 of one of the bezel segments 40 to 44. As can be seen, the inwardly facing surface 100 is divided into a plurality of generally parallel, longitudinally extending strips or bands, each band of which has a different optical property. In this embodiment, the inwardly facing surface 100 of the bezel segment is divided into two (2) bands 102 and 104. The band 102 nearest the display surface 24 is formed of a retro-reflective material and the band 104 furthest from the display surface 24 is formed of an infrared (IR) radiation absorbing material. To take best advantage of the properties of the retro-reflective material, the bezel segments 40 to 44 are oriented so that their inwardly facing surfaces extend in a plane generally normal to that of the display surface 24.

Figure 5:
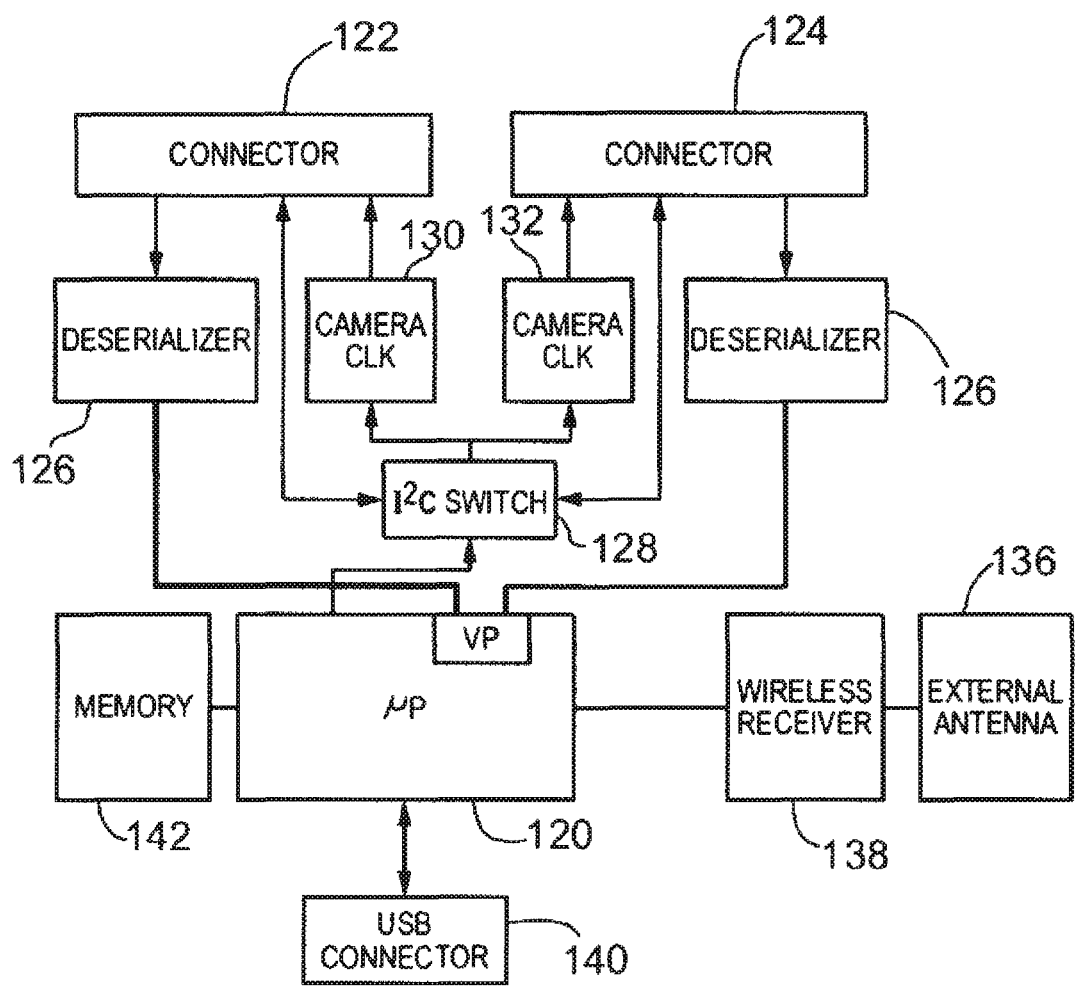
FIG. 5 is a block diagram of a master controller forming part of the interactive input system of FIG. 1.

Turning now to FIG. 5, the DSP unit 26 is better illustrated. As can be seen, DSP unit 26 comprises a controller 120 such as for example, a microprocessor, microcontroller, DSP etc. having a video port VP connected to connectors 122 and 124 via deserializers 126. The controller 120 is also connected to each connector 122, 124 via an I²C serial bus switch 128. I²C serial bus switch 128 is connected to clocks 130 and 132, each clock of which is connected to a respective one of the connectors 122, 124. The controller 120 communicates with an external antenna 136 via a wireless receiver 138, a USB connector 140 that receives USB cable 32 and memory 142 including volatile and non-volatile memory. The clocks 130 and 132 and deserializers 126 similarly employ low voltage, differential signaling (LVDS).

The computing device 30 in this embodiment is a personal computer or other suitable processing device comprising, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computer components to the processing unit. The computer may also comprise a network connection to access shared or remote drives, one or more networked computers, or other networked devices.

During operation, the controller 120 conditions the clocks 130 and 132 to output clock signals that are conveyed to the imaging assemblies 60 via the communication lines 28. The clock receiver 76 of each imaging assembly 60 uses the clock signals to set the frame rate of the associated image sensor 70. In this embodiment, the controller 120 generates clock signals so that the frame rate of each image sensor 70 is twice the desired image frame output rate. The controller 120 also signals the current control module 80 of each imaging assembly 60 over the I²C serial bus. In response, each current control module 80 connects the IR light source 82 to the power supply 84 and then disconnects the IR light source 82 from the power supply 84 so that each IR light source 82 turns on and off. The timing of the on/off IR light source switching is controlled so that for each pair of subsequent image frames captured by each image sensor 70, one image frame is captured when the IR light source 82 is on and one image frame is captured when the IR light source 82 is off.

When the IR light sources 82 are on, the IR light sources flood the region of interest over the display surface 24 with infrared illumination. Infrared illumination that impinges on the IR radiation absorbing bands 104 of the bezel segments 40 to 44 is not returned to the imaging assemblies 60. Infrared illumination that impinges on the retro-reflective bands 102 of the bezel segments 40 to 44 is returned to the imaging assemblies 60. The configuration of each IR light source 82 is selected so that the retro-reflective bands 102 are generally evenly illuminated over their entire lengths. Exemplary IR light source configurations to achieve generally even bezel illumination are described in U.S. Patent Application Publication No. 2009/0278795 to Hansen et al. entitled "Interactive Input System And Illumination Assembly Therefor" filed on May 9, 2008 and assigned to SMART Technologies ULC, the entire content of which is incorporated herein by reference. Of course, those of skill in the art will appreciate that other illumination techniques may be employed. As a result, in the absence of a pointer such as for example, a user's finger, a cylinder or other suitable object, a pen tool P or eraser tool, the image sensor 70 of each imaging assembly 60 sees a bright band having a substantially even intensity over its length disposed between an upper dark band corresponding to the IR radiation absorbing bands 104 and a lower dark band corresponding to the display surface 24. When a pointer is brought into proximity with the display surface 24 and is sufficiently distant from the IR light sources 82, the pointer occludes infrared illumination reflected by the retro-reflective bands 102. As a result, the pointer appears as a dark region that interrupts the bright band in captured image frames.

As mentioned above, each image frame output by the image sensor 70 of each imaging assembly 60 is conveyed to the DSP unit 26. In this embodiment, when the DSP unit 26 receives image frames from the imaging assemblies 60, the controller 120 processes only the image frames captured when the IR light sources 82 are on to detect the existence of a pointer therein and if a pointer exists, to determine the position of the pointer relative to the display surface 24 using triangulation.

Figure 6:
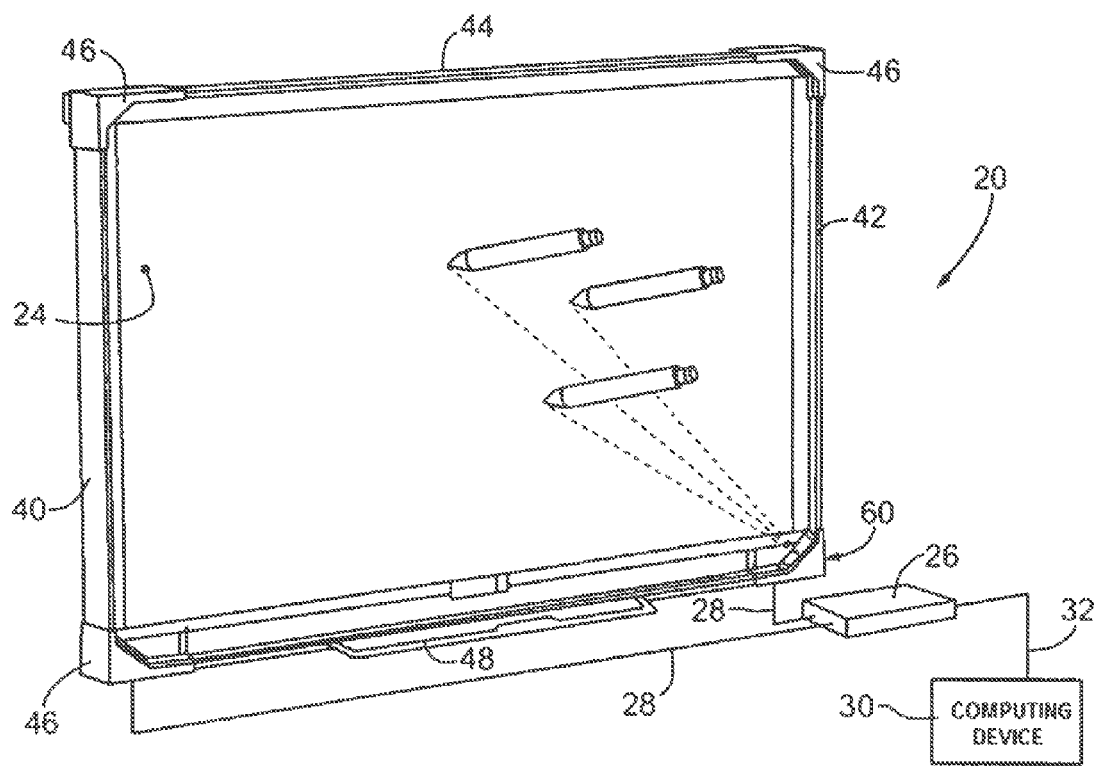
FIG. 6 is another perspective view of the interactive input system of FIG. 1, showing three (3) pointers in proximity therewith.

As will be appreciated, if only a single pointer is in proximity with the display surface 24, then the position of the pointer relative to the display surface 24 can be readily determined based on the location of the single pointer appearing in the captured image frames. However, if multiple pointers are in proximity with the display surface 24, determining the positions of the pointers appearing in captured image frames can be less straightforward. For example, FIG. 6 illustrates a scenario in which three (3) pointers have been brought into contact with the display surface 24. Depending on the spacing of the pointers, each of the three pointers can partially or completely occlude another pointer from the view of an image sensor 70 resulting in pointer ambiguity.

Figure 7:
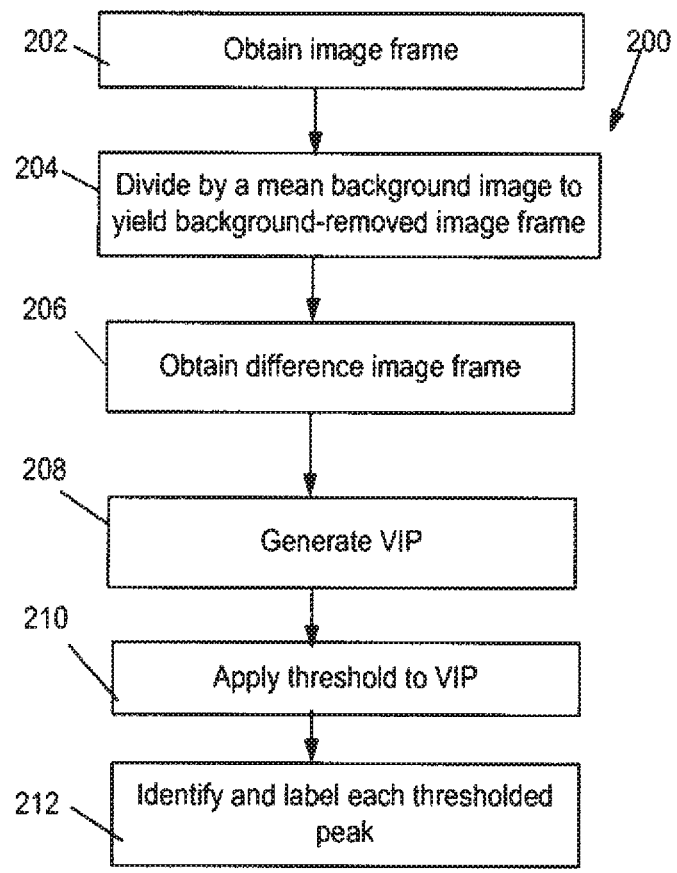
FIG. 7 is a flowchart showing the steps of a captured image frame processing method used by the interactive input system of FIG. 1.

To resolve such pointer ambiguity, the interactive input system 20 uses an image frame processing method shown in FIG. 7 and generally indicated using reference numeral 200. In this embodiment, image frame processing method 200 is carried out by the controller 120 which processes successive captured image frames output by the image sensor 70 of each imaging assembly 60. For each imaging assembly 60, when an image frame that has been captured when the IR light sources 82 are on is received, the controller 120 stores the image frame in a buffer (step 202). The controller 120 then divides the captured image frame by a mean background image stored in memory to form a background-removed image frame (step 204). At this step, the intensity value of each pixel of the captured image frame is divided by the intensity value of a corresponding pixel of the mean background image frame and, following this division, any intensity values greater than one (1) are set to one (1). In this embodiment, the mean background image frame is generated by averaging ten (10) frames captured when the light sources 82 are on, and when no pointer is present. The intensity value of each pixel of the background-removed image frame, which has a value that lies in the range from 0 to 1 is then subtracted from a value of one (1) to yield a difference image frame (step 206).

Figure 8:
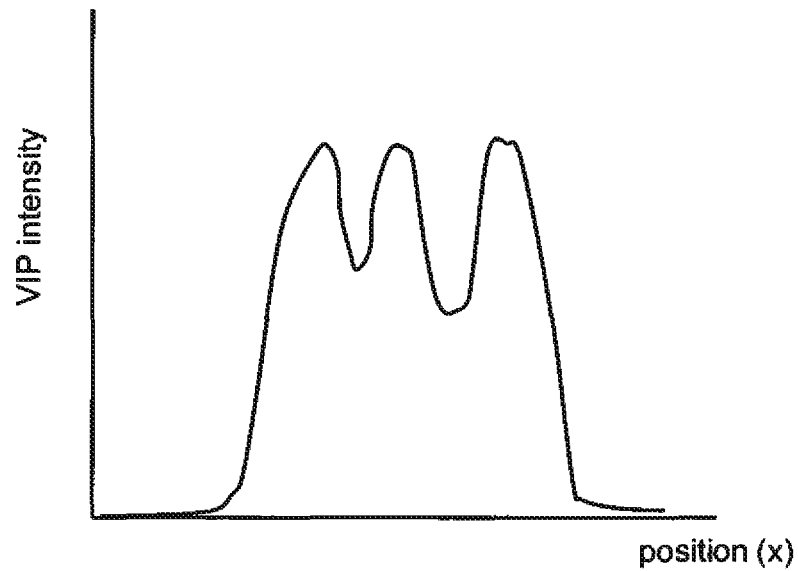
FIG. 8 is a graphical plot of a vertical intensity profile (VIP) generated from a captured image frame in which the three pointers of FIG. 6 are imaged.

Once the difference image frame has been calculated, the controller 120 generates a vertical intensity profile (VIP) for each pixel column of the difference image frame (step 208). Approaches for generating VIPs are described in U.S. Patent Application Publication No. 2009/0277697 to Bolt et al., and assigned to SMART Technologies ULC of Calgary, Alberta, the content of which is incorporated herein by reference in its entirety. In this embodiment, the VIP is generated by first cropping the difference image frame to reduce its size from 752×480 pixels to 752×60 pixels and to center the cropped difference image frame along the length of the bright band in the cropped difference image frame. The controller 120 then calculates an average intensity value of the sixty (60) pixels in each of the 752 pixel columns of the cropped difference image frame. As will be understood, pixel columns corresponding to non-occluded areas of the retro-reflective bands 102 will have a low average intensity value, while pixel columns corresponding to occluded areas of the retro-reflective bands 102 will have a high average intensity value. These 752 average intensity values are then represented as a function of pixel column position, x, to yield the VIP. FIG. 8 shows an exemplary VIP based on an image frame of the three (3) pointers shown in FIG. 6 captured by the imaging assembly 60 indicated therein. The VIP of FIG. 8 comprises three peaks that partially overlap, with each of the peaks corresponding to a respective one of the pointers.

Once the VIP has been generated, the values of the VIP are compared to a threshold value (step 210). In this embodiment, the threshold value has a value of 0.5. Based on this comparison, the controller 120 generates a box-car plot C(x) having a value of one (1) for each set of one or more consecutive VIP data points above the threshold value, and a value of zero (0) for VIP data points below the threshold value. As will be understood, the width of a box-car peak in the box-car plot C(x) generally corresponds to the width of a corresponding peak in the VIP. The controller 120 then calculates the center value ($x_{cen}$) of each box-car peak, and identifies each box-car peak of the box-car plot C(x) by assigning a unique number thereto. Each corresponding peak in the VIP is then labeled with its assigned unique number at the respective calculated center value $x_{cen}$ (step 212).

Figure 9:
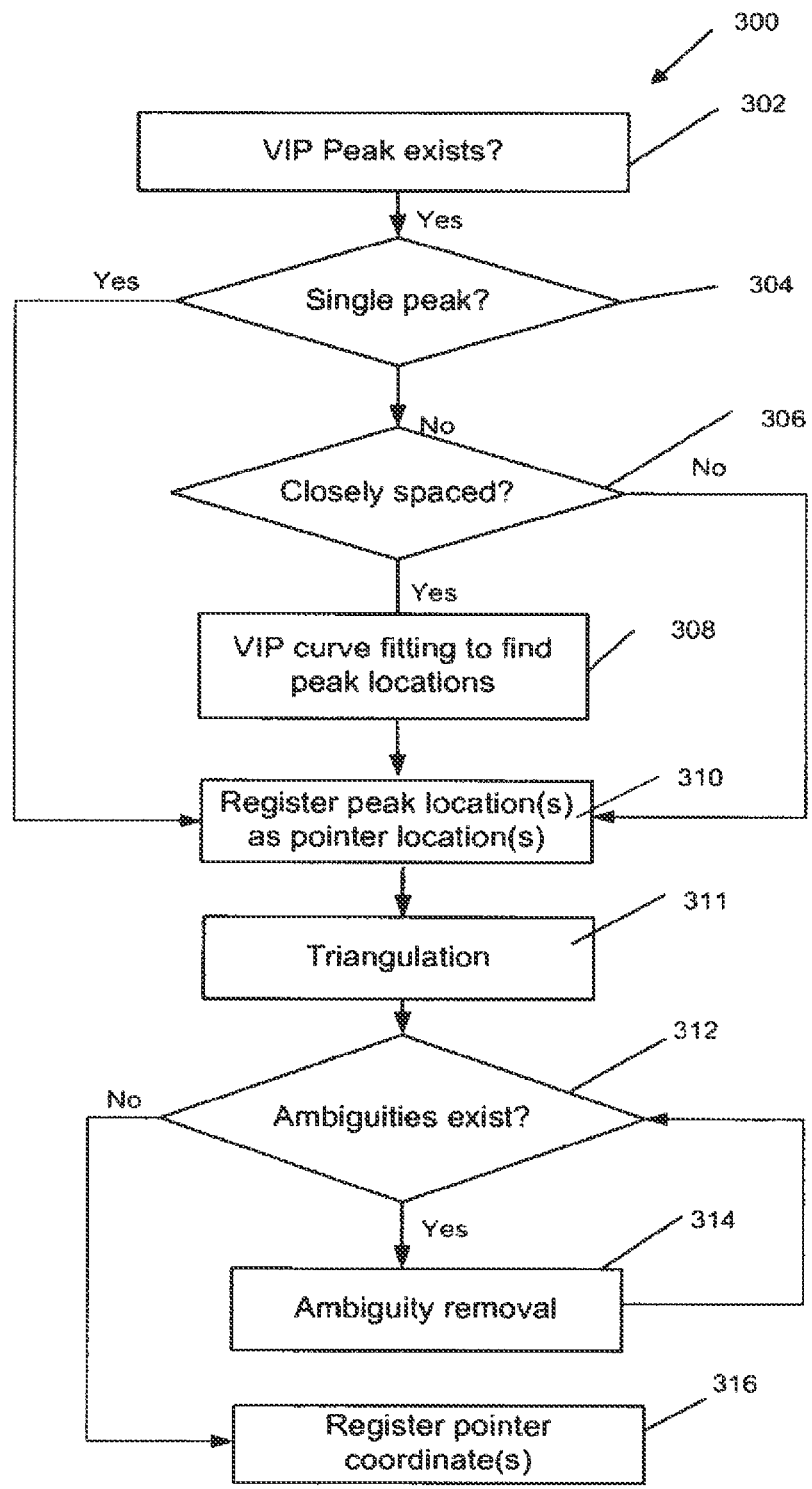
FIG. 9 is a flowchart showing the steps of a peak location method used by the interactive input system of FIG. 1.

To more accurately resolve VIP peaks that are closely spaced, the controller 120 uses a peak location method as shown in FIG. 9 and generally indicated by reference numeral 300. During this method, once a generated VIP has been labeled (step 302), the labeled VIP is first analyzed to determine if one or more peaks exist therein (step 304). If the labeled VIP has only one peak, the controller 120 registers the center value $x_{cen}$ of the box-car peak as the pointer location (step 310). However, if the labeled VIP has more than one peak, the box-car plot C(x) is analyzed to determine if the box-car peaks are closely spaced (step 306). In this embodiment, the smallest spacing between the box-car peaks is compared to a threshold spacing value. If the smallest spacing is greater than the threshold spacing value, the peaks are determined not to be closely spaced. In this case, the controller 120 registers the center values $x_{cen}$ of the box-car peaks as the pointer locations (step 310). At step 306, if the box-car peaks are determined to be closely spaced, the labeled VIP is subjected to a VIP curve fitting method (step 308), as will be described below.

As will be appreciated, fitting a curve to a series of data points comprising two or more peaks, such as the VIP shown in FIG. 8, may be non-trivial. For example, it may not be possible to accurately represent a VIP comprising a plurality of peaks simply by summing two or more functions. A more accurate approach involves analysis of a point-by-point maximum of the VIP as a function of position x. If f(x) and g(x) are functions, each representing a respective VIP generated from an image of two pointers seen at finite resolution, then the combined VIP function is given by:

$$\max([f(x_o, w, \sigma), g(x_o, w, \sigma)]) \quad (1)$$

where $x_o$ is the location of each peak, w is the intrinsic half-width of each respective VIP function, and $\sigma$ is the instrument profile width, the value of which is known for each image sensor 70.

The individual VIP functions $f(x)$ and $g(x)$ are proportional to the error function $\text{erf}(x)$. The VIP may be parameterized as:

$$\frac{1}{2} \cdot \left( \text{erf}\left( \frac{x+w}{\sqrt{2}\,\sigma} \right) - \text{erf}\left( \frac{x-w}{\sqrt{2}\,\sigma} \right) \right) \quad (2)$$

An adjustable parameter A accounting for amplitude may also be introduced.

Figure 10:
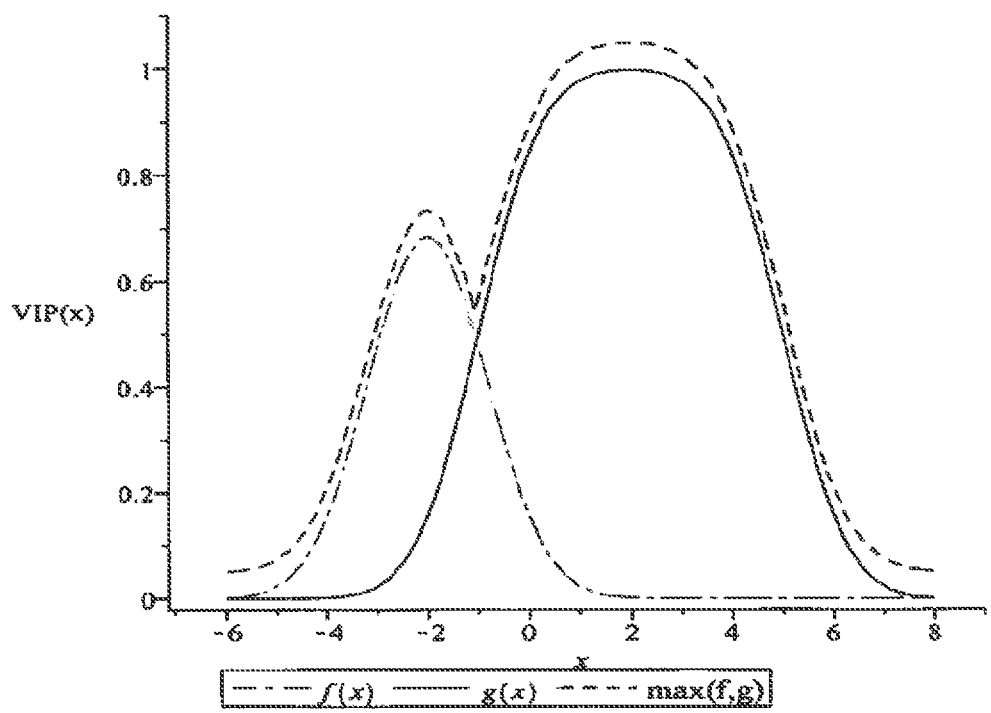
FIG. 10 is a graphical plot of a combination function fitted to two (2) exemplary, partially overlapping functions.

FIG. 10 is a graphical plot of a combination function fitted to two exemplary, partially overlapping VIP functions $f(x)$ and $g(x)$ using the point-by-point maximum approach. The solid and dash-dot lines represent the individual VIP functions $f(x)$ and $g(x)$, respectively. The dashed line represents the combination function max(f, g), which has been vertically shifted for clarity.

The point-by-point maximum approach is suitable for fitting curves to VIPs comprising two or more peaks. For a VIP comprising three peaks, an appropriate combination function is given by:

$$\max([f(x_o, w, \sigma), g(x_o, w, \sigma), h(x_o, w, \sigma)]) \quad (3)$$

Similarly, for a VIP comprising an arbitrary number of peaks, an appropriate combination function is:

$$\max([f(x_o, w, \sigma), g(x_o, w, \sigma), h(x_o, w, \sigma), \ldots]) \quad (4)$$

A nonlinear least squares algorithm is used to fit the combination function to the VIP. In this embodiment, the nonlinear least squares algorithm that is employed is the conjugate gradient algorithm, which is described in "Inverse Problem Theory and Methods for Model Parameter Estimation", authored by Tarantola, published by the Society for Industrial and Applied Mathematics, Philadelphia, U.S.A., 2005l pages 217-218. The conjugate gradient algorithm is recognized as an efficient approach for solving nonlinear least squares problems, and generally requires fewer computational resources than other approaches.

The quality of a least squares fit, or the "goodness-of-fit", $\chi_v^2$, is given by:

$$\chi_v^2 = \frac{1}{N-M} \cdot \sum_{i=1}^{N} \frac{(y_i - F(x_i, a_1, a_2, \ldots))^2}{\sigma_i^2} \quad (5)$$

where N is the number of data points $(x_i, y_i)$ of the VIP data, $i=1, \ldots N$, M is the number of parameters $a_j$, $j=1, \ldots M$, defining the model function $F(x_i, a_1, a_2, \ldots)$, and $\sigma_i$ is the error for each data point $(x_i, y_i)$. In this embodiment, the parameters $a_j$ are the peak location $x_{on}$, the width $w_n$ and the amplitude $A_n$ of each of the n VIP peaks, and the instrumental profile width $\sigma$.

As will be understood, the cumulative value of $\sigma_i$ for all data points is generally indicative of the noise in the data. For simplicity, it may be assumed that noise is negligible and $\sigma_i = 1$ for all data points, upon which the quality of a least squares fit $\chi_v^2$ is given by:

$$\chi_v^2 = \frac{1}{N-M} \cdot \sum_{i=1}^{N} (y_i - F(x_i, a_1, a_2, \ldots))^2 \quad (5a)$$

As is known in the art, a value of $\chi_v^2$ near or equal to 1 obtained using equation (5) generally represents a "good" fit. However, under the assumption of $\sigma_i = 1$1 a generally small value of $\chi_v^2$ obtained using equation (5a) represents a "good fit".

The result of the conjugate gradient algorithm is a set of best-fit parameters, namely the peak locations $x_{on}$, the half widths $w_n$, and the amplitudes $A_n$ of each of the n peaks, and the instrumental profile width $\sigma$. A general goal of the algorithm is to determine a "best" model, so as to establish the number of peaks that "best" fit the data.

To accurately identify the number of peaks present in a VIP, it is necessary not only to use the $\chi_v^2$ goodness-of-fit measure for evaluating fit, but also to determine if the correct model has been used, such as for example a two-peak model versus a three-peak model. As will be understood, there are six parameters for a two-peak VIP model, namely peak locations $x_{o1}$, $x_{o2}$, widths $w_1$, $w_2$, and amplitudes $A_1$ and $A_2$, and there are nine parameters for a three-peak VIP model, namely peak locations $x_{o1}$, $x_{o2}$, $x_{o3}$, widths $w_1$, $w_2$, $w_3$, and amplitudes $A_1$, $A_2$ and $A_3$. A measure of whether the correct model has been used is provided by the Akaike Information Criterion (AIC). The AIC is described in "Information-based Inversion and Processing with Application", authored by Ulrych and Sacchi, published in the Handbook of Geophysical Exploration, Section I, Seismic exploration, vol. 36, 2005l pages 146-149. For the case of normally-distributed observation errors, the AIC is given by:

$$\text{AIC}(k) = N \cdot \log(s_k^2) + 2 \cdot k \quad (6)$$

where N is the number of data points being fitted, k is the number of parameters used in a particular model which, for two- and three-peak VIP functions are six and nine, respectively, and $s_k^2$ is the mean square value of the fit residuals, given by:

$$s_k^2 = \frac{1}{N} \cdot \sum_{i=1}^{N} (Obs - Cal)^2 \quad (7)$$

where Obs is the observed or experimental image data value, and Cal is the value calculated using the curve fitting method described herein. When comparing different curve fits to a given data set, the curve fit yielding the lowest value of AIC is deemed to be the correct fit.

Figure 11:
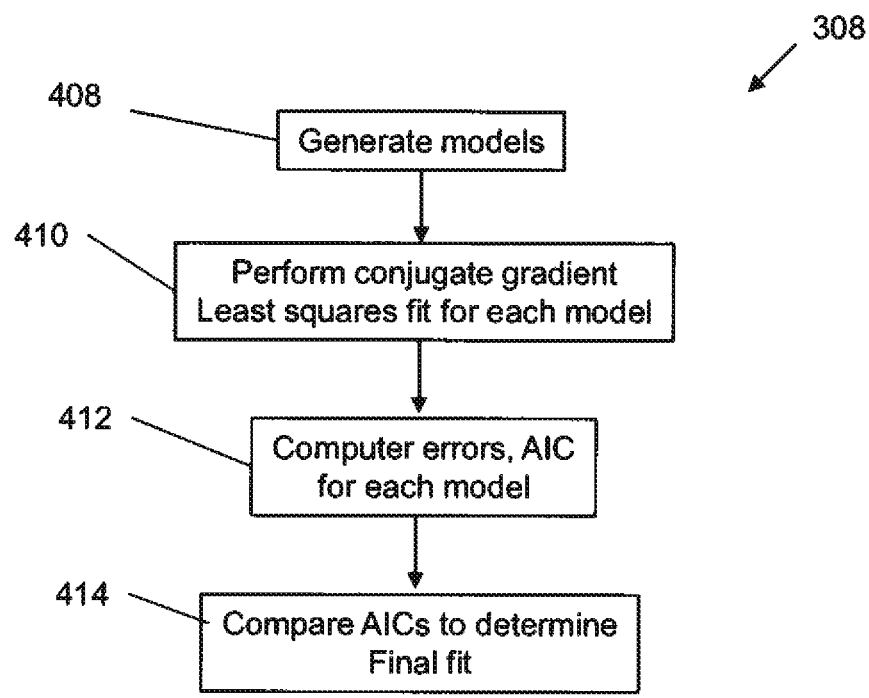
FIG. 11 is a flowchart showing the steps of a VIP curve fitting method used in the peak location method of FIG. 9.

FIG. 11 is a flowchart showing the steps performed during the VIP curve-fitting method used in step 308 referred to above. The VIP curve-fitting method 308 comprises four steps, namely generating different models each having a different number of peaks (step 408), performing the conjugate gradient least squares fit for each model (step 410), computing the AIC for each model (step 412), and comparing the AIC values of the different models to find a final correct model (step 414).

In step 408, a group of models are generated, each model having a different number of peaks. In this embodiment, a total of three models are generated, namely a first model having one fewer peak than that determined following the VIP thresholding step (step 210), a second model having the same number of peaks as that determined from the VIP thresholding step, and a third model having one greater number of peaks than that determined from the VIP thresholding. Of course, it will be understood that the variety of models generated is not limited to the configuration described herein and that in other embodiments, other models may be generated. Each generated model comprises an initial set of parameters for peak locations $x_{on}$, peak half widths $w_n$, and peak amplitudes $A_n$ for the number n peaks used in the model.

Figure 12:
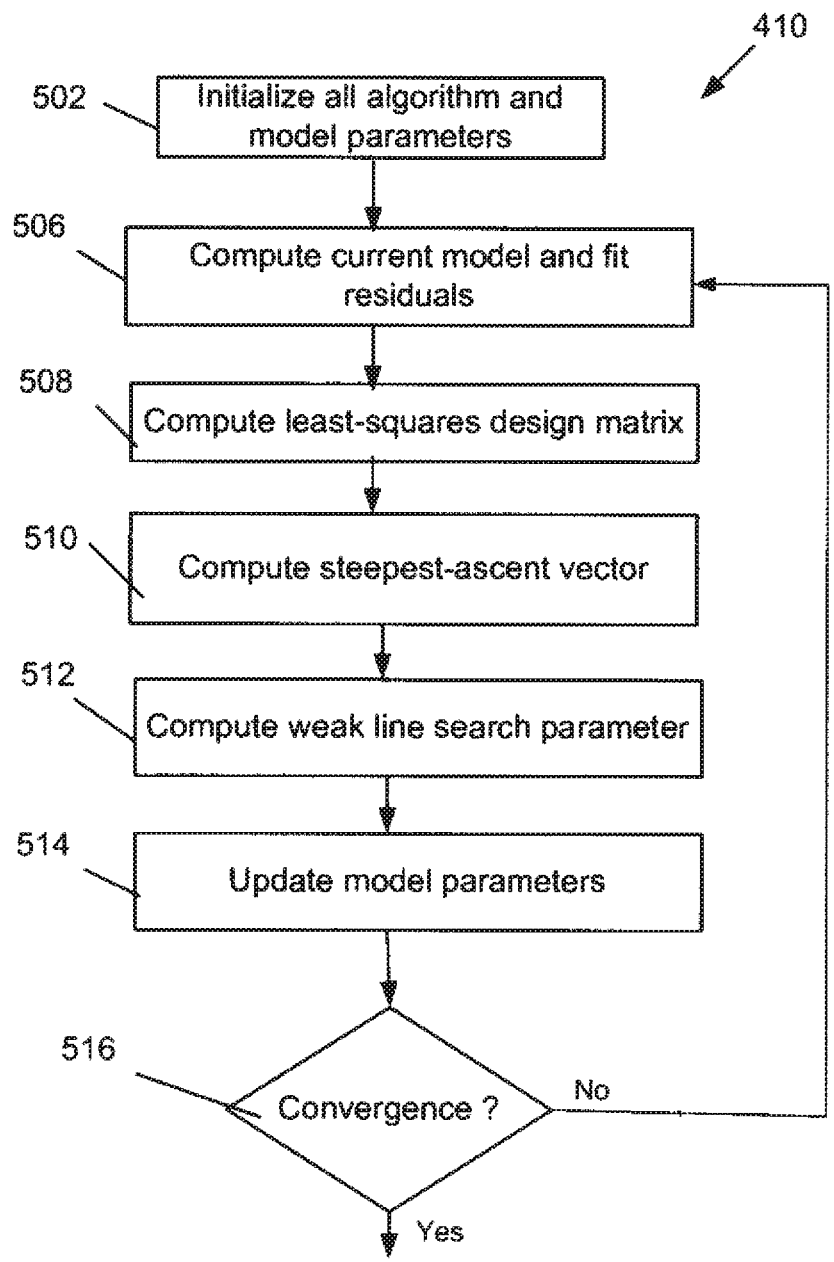
FIG. 12 is a flowchart showing the steps of a conjugate gradient least squares fit process of the VIP curve fitting method of FIG. 11.

A conjugate gradient least squares fit is then performed for each model. FIG. 12 shows the steps in the conjugate gradient least squares fit process that are carried out in step 410. First, for each model, all model and algorithm parameters are initialized (step 502). In this embodiment, the model parameters comprise an initial set of parameters for the model, and the algorithm parameters comprise finite-difference intervals, VIP data, and a prior model covariance matrix. The current model is then computed, and the fit residuals, which are the differences between the computed values and the original observed values, are calculated (step 506). A current sum of squares is then computed based on the residuals. A least squares design matrix is then generated from forward finite-difference derivatives of the model function (step 508). A steepest-ascent vector is then computed using the least squares design matrix (step 510). As will be understood by those of skill in the art, the steepest-ascent vector is the vector in the parameter space that points in a direction having the greatest change in the sum of squares. Next, the weak line search parameter is computed based on the steepest-ascent vector (step 512). The principles of weak line search and steepest-ascent vector are described in modern texts on optimization such as, for example, "Practical Optimization", authored by Gill, Murray and Wright, published by Springer, New York, U.S.A., 1982. Following step 512, the model parameters are then updated using the weak line search parameter and the steepest-ascent vector (step 514). A convergence test is then performed (step 516). If the difference between the current sum of squares and the previous sum of squares is less than a first threshold, and if the norm of the steepest-ascent vector is less than a second threshold, then the solution is declared to have converged and the process proceeds to step 412. Otherwise, the process returns to step 506.

Following the conjugate gradient least squares fit at step 410, AIC values are then calculated for each of the different model functions using the fit residuals (step 412). A final "best" model is then decided based on a comparison of the AIC values (step 414), whereby the model having the lowest value of AIC is adopted as the Final fit. Here, the final values of the parameters for each peak of the VIP, namely the peak location $x_o$, width w and amplitude A, are determined. In this embodiment, in this step the mean and median of the fit residuals are examined for possible systematic errors. If no systematic errors are found, and turning again to FIG. 9, the controller 120 then registers the values of the peak locations $x_o$ as the pointer locations (step 310).

Following step 310, the controller 120 uses the registered peak locations to calculate the position of each of the pointers in (x,y) coordinates relative to the display surface 24 using triangulation in the well known manner, such as that described in above-incorporated U.S. Pat. No. 6,803,906 to Morrison et al. (step 311).

The pointer coordinates determined in step 311 are then analyzed to determine if an ambiguity exists (step 312). If an ambiguity is determined to exist, the pointer coordinates are then subjected to an ambiguity removal process (step 314). Ambiguity identification and removal methods are disclosed previously in U.S. Patent Appplication Publication No. 2010/0201812 to McGibney et al. entitled "Active Display Feedback in Interactive Input Systems" filed on Feb. 11, 2009 and assigned to SMART Technologies, ULC, the content of which is herein incorporated by reference in its entirety. In this embodiment, the ambiguity removal process of step 314 yields new pointer coordinates, which are then subjected to ambiguity determination in step 312. If no ambiguity is determined to exist in step 312, the pointer coordinates are registered for further processing (step 316). Here, the calculated pointer coordinates are conveyed by the controller 120 to the computing device 30 via the USB cable 32. The computing device 30 in turn processes the received pointer coordinates and updates the image output provided to the display unit, if required, so that the image presented on the display surface 24 reflects the pointer activity. In this manner, pointer interaction with the display surface 24 can be recorded as writing or drawing or used to control execution of one or more application programs running on the computing device 30.

Although in the above description the pointers are described as being passive pointers, active pointers can also be used. When one or more active pointers, such as one or more pen tools P, are in proximity with the interactive surface the IR light sources 82 remain off. As a result, active pointers appear as bright regions in otherwise dark image frames. These image frames are processed to obtain negative image frames, which are then further processed using the methodologies described above.

Figure 13:
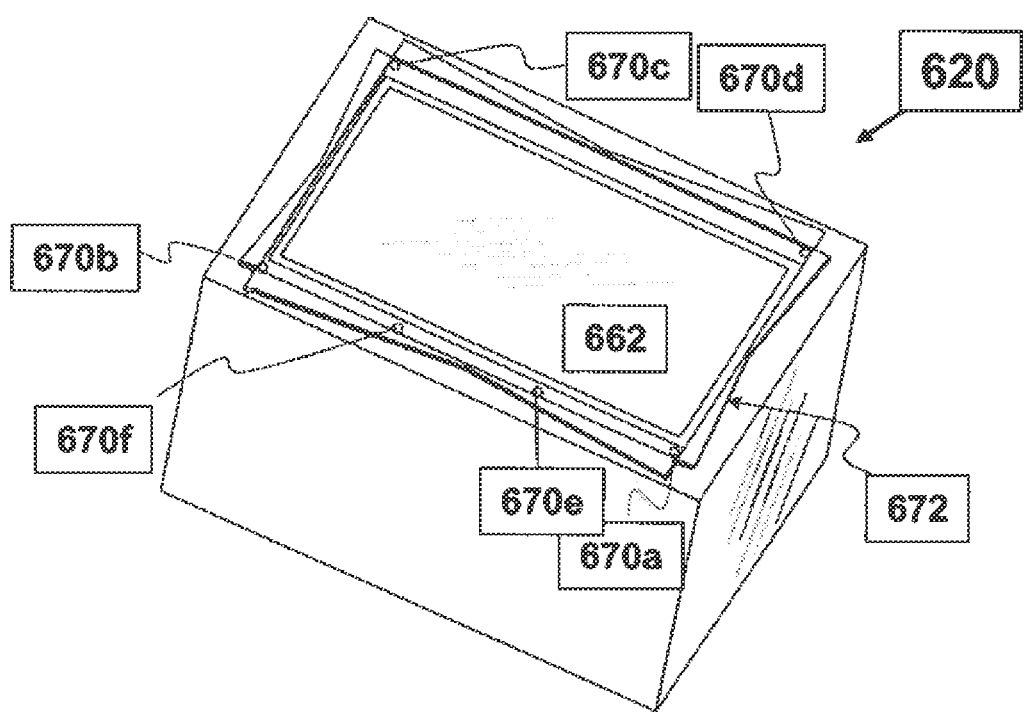
FIG. 13 is a perspective view of another embodiment of an interactive input system.

The VIP curve fitting method described above is not limited for use in interactive input system 20, and may alternatively be used in other interactive input systems such as those that comprise more than two imaging assemblies in order to more accurately determine the locations of multiple pointers using triangulation. FIG. 13 shows another embodiment of an interactive input system in the form of a touch table, and which is generally indicated by reference numeral 620. Interactive input system 620 is generally similar to that described in U.S. Patent Application Publication No. 2011/0006981 to Chtchetinine et al. entitled "INTERACTIVE INPUT SYSTEM" filed on Jul. 10, 20091 assigned to SMART Technologies, ULC, the content of which is incorporated herein by reference in its entirety. Interactive input system 620 comprises six (6) imaging assemblies 670a to 670f positioned about the periphery of the input area 662, and which look generally across the input area 662. An illuminated bezel 672 surrounds the periphery of the input area 662 and generally overlies the imaging assemblies 670a to 670f. Illuminated bezels are described in U.S. Pat. No. 6,972,401 to Akitt et al., entitled "ILLUMINATED BEZEL AND TOUCH SYSTEM INCORPORATING THE SAME", assigned to SMART Technologies, ULC, the content of which is herein incorporated by reference in its entirety. The illuminated bezel 672 provides backlight illumination into the input area 662. To improve the accuracy of detection of multiple targets, processing structure of interactive input system 620 utilizes the VIP curve-fitting method described above with reference to FIGS. 11 and 12, together with a weight matrix method disclosed in PCT Application No. PCT/CA2010/001085 to Chtchetinine et al. entitled "INTERACTIVE INPUT SYSTEM AND METHOD" filed on Jul. 12, 2010, assigned to SMART Technologies, ULC, the content of which is incorporated herein by reference in its entirety.

Although in embodiments described above the nonlinear least squares algorithm is a conjugate gradient algorithm, in other embodiments, other nonlinear least squares algorithms may alternatively be used. For example, the nonlinear least squares algorithm may be any of a Levenberg-Marquardt algorithm and a nonlinear simplex algorithm.

It will be understood that the VIP need not be generated using the approaches described above, and in other embodiments, other approaches may alternatively be used to generate the VIP, such as those described in the above-incorporated U.S. Patent Application Publication No. 2009/0277697 to Bolt et al.

The VIP processing methodologies described above may be embodied in a computer program comprising program modules including routines, object components, data structures, and the like, and may be embodied as computer readable program code stored on a non-transitory computer readable medium. The computer readable medium is any data storage device that can store data. Examples of computer readable media comprise for example read-only memory, random-access memory, CD-ROMs, magnetic tape, USB keys, flash drives and optical data storage devices. The computer readable program code can also be distributed over a network including coupled computer systems so that the computer readable program code is stored and executed in a distributed fashion.

EXAMPLES

The following examples illustrate various applications of the above-described systems and methods. For all of these examples, image frames were captured using image sensors 70 configured using settings summarized in Table 1 below:

TABLE 1

| Parameter | |
|---|---|
| Brightness | 156 |
| Exposure | 57 |
| Shutter speed (ms) | 2.59 |
| Gain (dB) | 0.0 |
| Frame rate (Hz) | 59.36 |
| Image size (pixels) | 752 × 20 |

Here, "Brightness" is the level of black in an image frame, where a high brightness value corresponds to a low amount of black in the image frame; "Exposure" corresponds to the average gray level intensity of the image frame, and has a value between 0 and 255; and "Gain" is the amount of amplification applied to each pixel, wherein an increase in "Gain" results in a brighter image and an increase in noise.

Each captured image frame was first processed by dividing by a mean background image frame. The VIP was then generated from the processed captured image frame.

FIGS. 14 to 18 are graphical plots showing curves fitted to exemplary VIPs. In these Figures, each VIP is indicated by dots, the fitted curve is indicated by a solid line, the peak locations are indicated by boxes, and the fit residuals are indicated by crosses. The fit residuals have been vertically shifted downward for clarity by 0.1 units.

Figure 14:
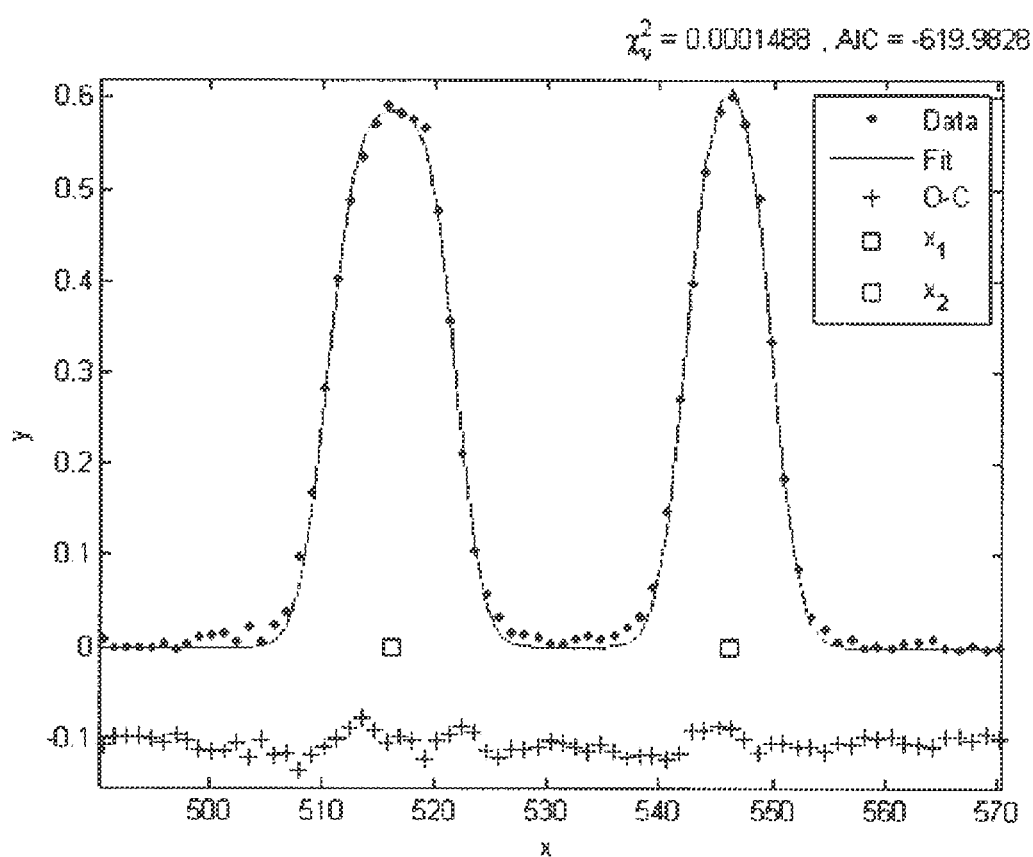
FIG. 14 is graphical plot of a curve fitted to an exemplary VIP comprising two (2) generally non-overlapping peaks, using the VIP curve fitting method of FIG. 11.
Figure 15:
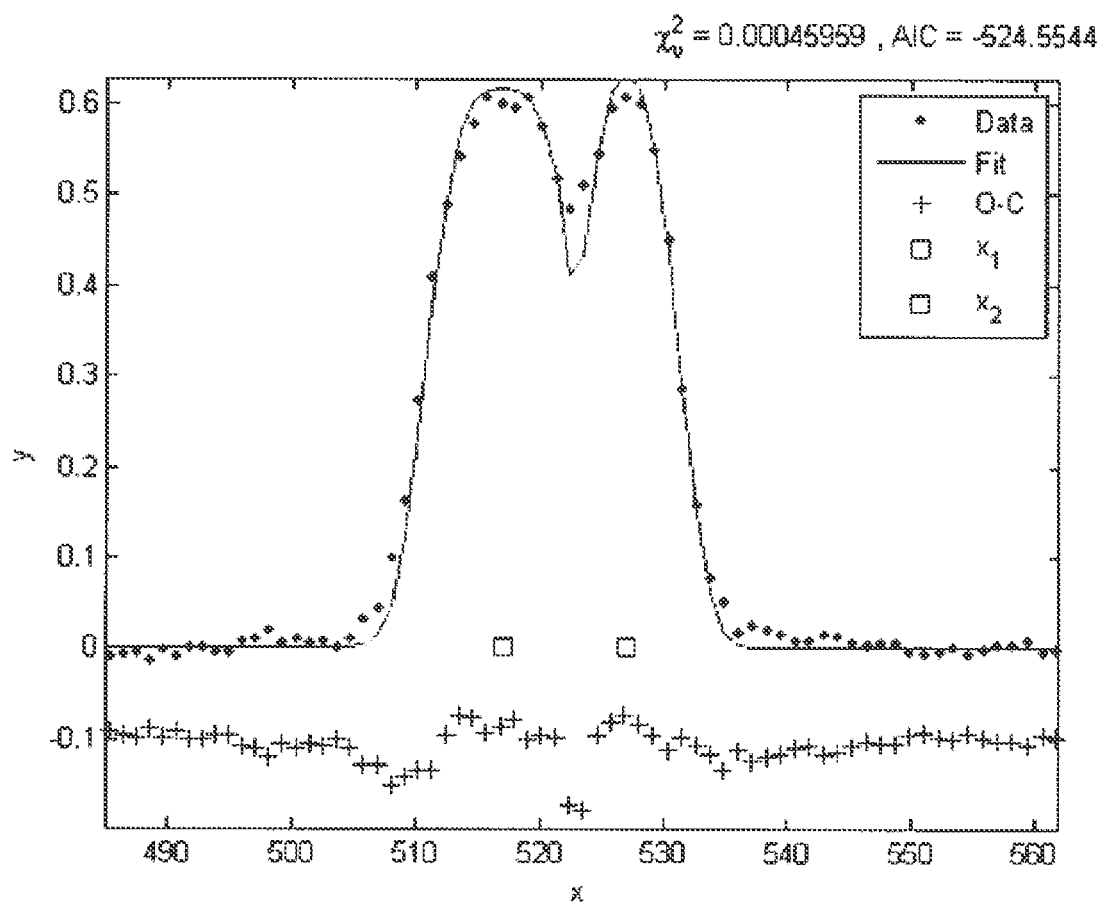
FIG. 15 is a graphical plot of a curve fitted to an exemplary VIP comprising two (2) partially overlapping peaks, using the VIP curve fitting method of FIG. 11.

FIGS. 14 and 15 show curves fitted to VIPs comprising two peaks, and in which the peaks are separate and partially overlapping, respectively. The results of the curve fitting method for each of these VIPs are shown in Table 2:

TABLE 2

| Parameter | FIG. 14 | FIG. 15 |
|---|---|---|
| $x_1$ (pixels) | 516.09 ± 0.04 | 516.98 ± 0.09 |
| $w_1$ (pixels) | 5.74 ± 0.05 | 6.2 ± 0.01 |
| $A_1$ | 0.588 ± 0.05 | 0.617 ± 0.09 |
| $x_2$ (pixels) | 546.13 ± 0.04 | 526.92 ± 0.09 |
| $w_2$ (pixels) | 3.85 ± 0.06 | 4.2 ± 0.01 |
| $A_2$ | 0.643 ± 0.09 | 0.65 ± 0.02 |
| $\sigma_{IP}$ (pixels) | 2.75 (fixed) | 2.75 (fixed) |
| $\chi_v^2$ | 0.0001488 | 0.0004596 |
| AIC, k = 6 | −619.983 | −524.554 |
| Mean residual | −0.0076 | −0.0093 |
| RMS error | ±0.021 | ±0.026 |

As may be seen in Table 2l the mean residual value for both FIGS. 14 and 15 are generally near the value of −0.11 indicating that the true value of the residuals is generally near a value of 0 when vertical shifting is considered. For FIG. 14, the mean residual value is −0.0076 while the value of root-mean-square (RMS) error of a single data point, which generally represents the standard deviation of the residuals, is +/−0.0211 and wherein the units of these values are those of the VIP data. Similarly, for FIG. 15, the mean residual value is −0.0093 while the RMS error of a single data point is +/−0.026. As will be understood, these values are generally low and therefore indicate that both fits are satisfactory. Computed errors for each of the calculated parameters are also shown in Table 2. As may be seen, all of the computed errors are generally low. For example, the computed error value for peak location $x_1$=516.09 in FIG. 14 is ±0.04 pixels, which generally means that the same fit will be generated even in view of an uncertainty of ±0.04 pixels in this peak location. This computed error value may alternatively be regarded as the determination of the peak location to within a range of values from 516.05 to 516.13. As will be appreciated, the relative narrowness of this range is indicative of the high accuracy of the curve fitting method.

Figure 16:
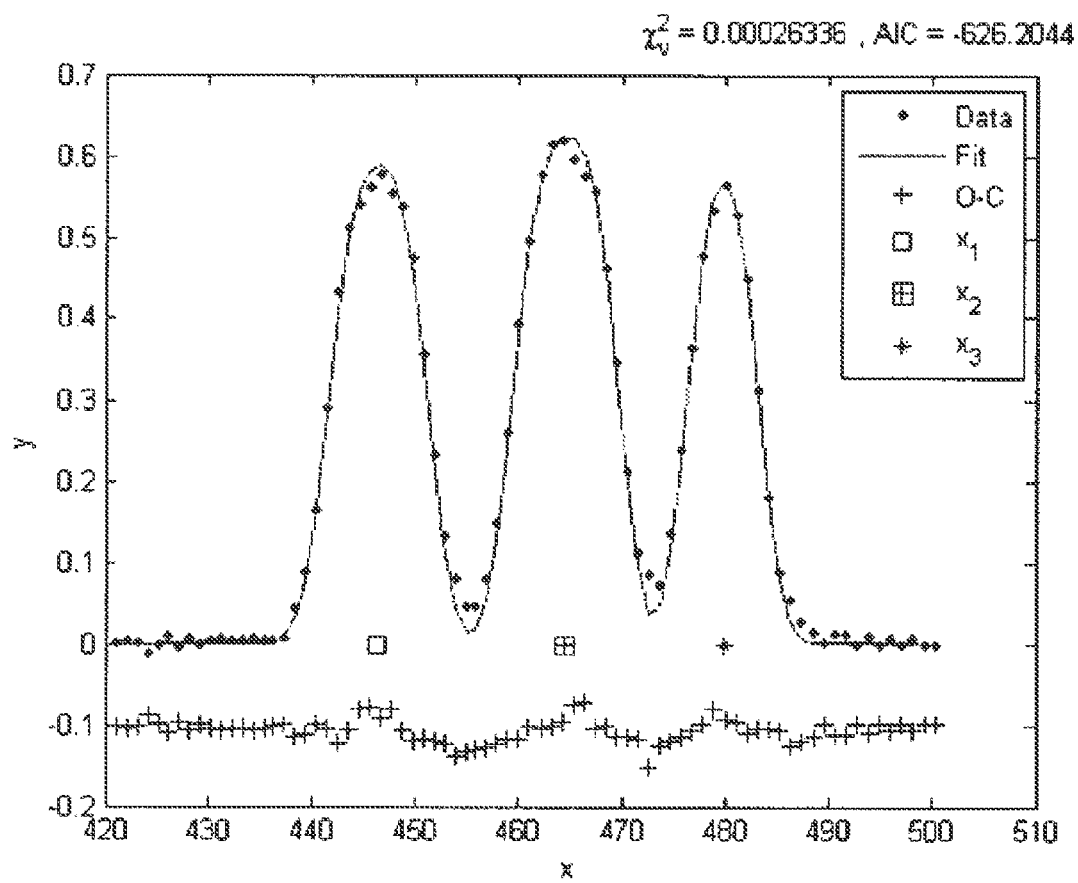
FIG. 16 is a graphical plot of a curve fitted to an exemplary VIP comprising three (3) generally non-overlapping peaks, using the VIP curve fitting method of FIG. 11.
Figure 17:
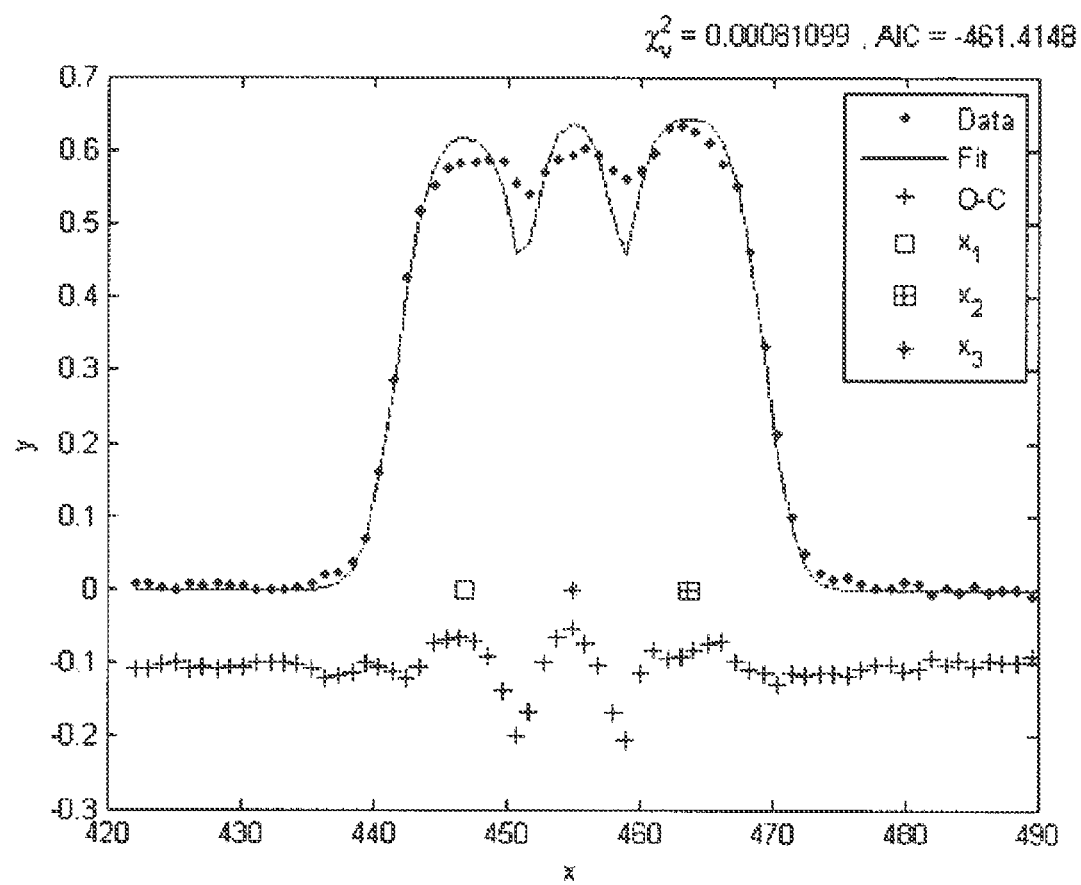
FIG. 17 is a graphical plot of a curve fitted to an exemplary VIP comprising three (3) partially overlapping peaks, using the VIP curve fitting method of FIG. 11.

FIGS. 16 and 17 show curves fitted to VIPs comprising three peaks, and in which the peaks are separate and partially overlapping, respectively. The results of the curve fitting method for each of these cases are shown in Table 3:

TABLE 3

| Parameter | FIG. 16 | FIG. 17 |
|---|---|---|
| $x_1$ (pixels) | 446.31 ± 0.05 | 446.8 ± 0.01 |
| $w_1$ (pixels) | 4.73 ± 0.07 | 5.1 ± 0.02 |
| $A_1$ | 0.596 ± 0.08 | 0.62 ± 0.01 |
| $x_2$ (pixels) | 464.54 ± 0.05 | 463.7 ± 0.01 |
| $w_2$ (pixels) | 4.99 ± 0.06 | 5.7 ± 0.01 |
| $A_2$ | 0.630 ± 0.08 | 0.65 ± 0.01 |
| $x_3$ (pixels) | 479.75 ± 0.05 | 455.0 ± 0.02 |
| $w_3$ (pixels) | 3.37 ± 0.09 | 4.4 ± 0.03 |
| $A_3$ | 0.62 ± 0.01 | 0.65 ± 0.02 |
| $\sigma_{IP}$ (pixels) | 2.70 (fixed) | 2.70 (fixed) |
| $\chi_v^2$ | 0.0002634 | 0.0008110 |
| AIC, k = 9 | −626.204 | −461.415 |
| Mean residual | 0.0065 | −0.0051 |
| RMS error | ±0.016 | ±0.028 |

For FIG. 16, the mean residual and RMS error values are 0.0065 and +/−0.0161 respectively. For FIG. 17, the mean residual and RMS error values are −0.0051 and +/−0.0281 respectively. The results of the curve fitting method are shown in Table 4. As in the case FIGS. 14 and 15, these values are generally low and therefore indicate that both fits are very satisfactory.

Figure 18:
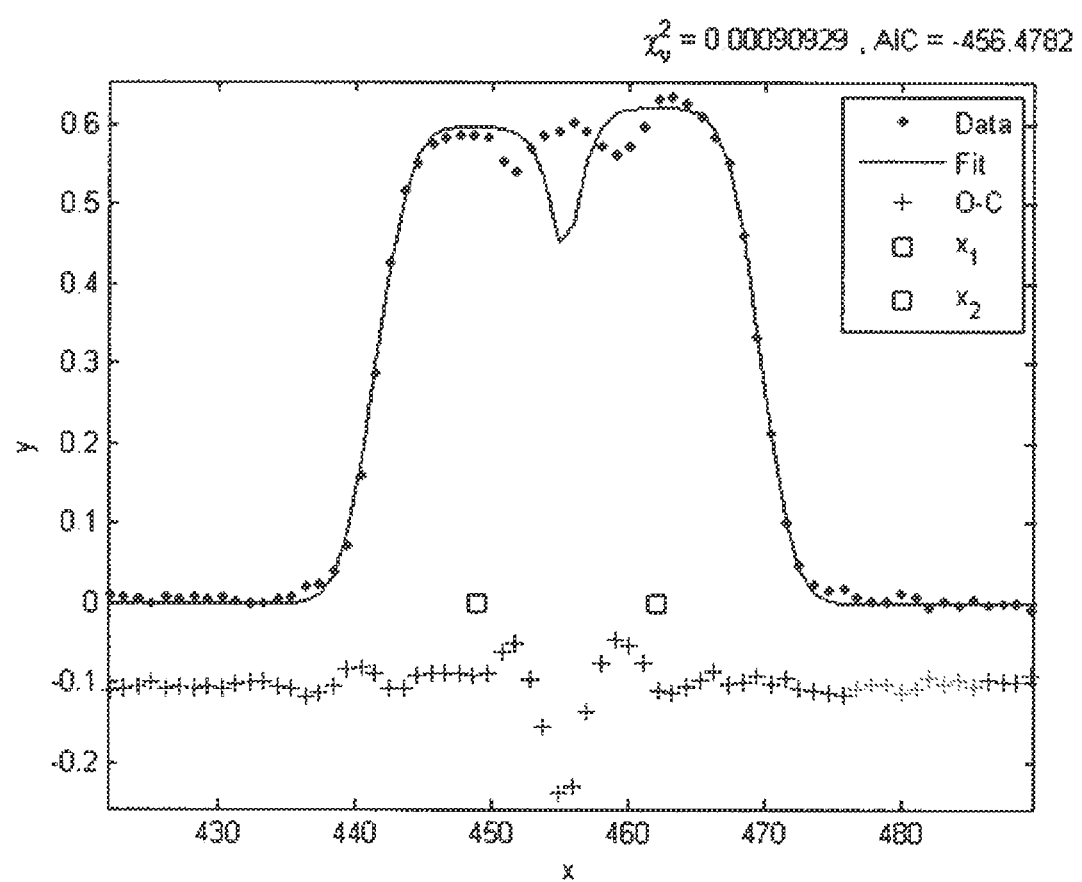
FIG. 18 is a graphical plot of a curve fitted to the exemplary VIP shown in FIG. 17, using the VIP curve fitting method of FIG. 11 for which a two-peak model is used.

As described above, the AIC algorithm may be used to determine if the correct model has been chosen. The value of the AIC is different for different models and, for a given VIP data set, the correct model is that having the lowest value of AIC. FIG. 18 shows a different curve representing a two-peak model fitted to the VIP data of FIG. 17. The results of the curve fitting method using a different model are shown below in Table 4:

TABLE 4

| Parameter | FIG. 18 |
| --- | --- |
| $x_1$ (pixels) | 448.8 ± 0.2 |
| $w_1$ (pixels) | 7.4 ± 0.2 |
| $A_1$ | 0.60 ± 0.01 |
| $x_2$ (pixels) | 462.1 ± 0.1 |
| $w_2$ (pixels) | 7.6 ± 0.2 |
| $A_2$ | 0.62 ± 0.01 |
| $\sigma_{IP}$ (pixels) | 2.75 (fixed) |
| $\chi_v^2$ | 0.0009093 |
| AIC, k = 6 | −456.478 |
| Mean residual | −0.0028 |
| RMS error | ±0.030 |

A comparison of results obtained using the three-peak fit model of FIG. 17, shown in Table 3l and the two-peak fit model of FIG. 18, shown in Table 4l reveals little difference between the residuals for each of these models. Therefore, both models fit the original image data generally well. However, the AIC value for FIG. 16 is −461.4151 which is lower than the AIC value for FIG. 18 of −456.478. Similarly, the reduced chi-squared $\chi_v^2$ value of FIG. 17 is lower than that of FIG. 18. These results indicate that the three-peak model is a better fit than the two-peak model, which generally agrees with empirical observation of these two Figures.

It should be noted that for the examples shown in FIGS. 14 to 18, no significant parameter correlations were used. As will be appreciated, the results generally indicate that the proposed method is a generally accurate one.

One of ordinary skill in the art would understand that mathematical methods and formulae described above are exemplary, and that other comparable methods and formulae may be used without departing from the spirit and scope of the embodiments described above.

Although embodiments have been described above with reference to the accompanying drawings, those of skill in the art will appreciate that variations and modifications may be made without departing from the spirit and scope thereof as defined by the appended claims.

What is claimed is:

1. A method of determining locations of at least two pointers in a captured image frame, the method comprising:
   generating a vertical intensity profile (VIP) from the captured image frame, the VIP comprising peaks generally corresponding to the at least two pointers;
   determining if the peaks are closely spaced and, if the peaks are closely spaced:
      fitting a curve to the VIP by calculating a nonlinear least squares fit for at least one model, each model comprising at least two peaks, each peak having at least one of a respective peak location, a respective peak half-width and a respective peak amplitude, calculating a goodness-of-fit value for each model and determining a final model by comparing the goodness-of-fit values, the final model being said fitted curve;
   analyzing the fitted curve to determine peak locations of the fitted curve; and
   registering the determined peak locations as the pointer locations.

2. The method of claim 1, wherein if the peaks are determined not to be closely spaced, the method further comprising:
   analyzing the VIP to determine the peak locations; and
   registering the determined peak locations as the pointer locations.

3. The method of claim 1, wherein the nonlinear least squares fit is calculated using one of a conjugate gradient algorithm, a Levenberg-Marquardt algorithm, and a nonlinear simplex algorithm.

4. The method of claim 1, wherein the fitting a curve further comprises:
   calculating an Akaike Information Criterion (AIC) value for each model; and
   determining the final model by comparing the goodness-of-fit values and the AIC values.

5. The method of claim 4, wherein the final model determined is the model having at least one of a lowest goodness-of-fit value and a lowest AIC value.

6. The method of claim 5, further comprising:
   calculating a value of fit residuals for each model,
   wherein the AIC value for each model is calculated based on the value of the fit residuals.

7. The method of claim 1, wherein the at least one model is based on a point-by-point maximum of the VIP, the point-by-point maximum given by:

$$\max([f(x_o, w, \sigma), g(x_o, w, \sigma), h(x_o, w, \sigma), \ldots])$$

where $f(x, w, \sigma)$, $g(x, w, \sigma)$ and $h(x, w, \sigma)$ each represent an individual VIP function corresponding to a respective VIP peak, and where $x_o$ is the peak location and w is the half-width of each individual VIP function, and σ is instrumental profile width.

8. The method of claim 7, wherein each VIP peak is proportional to an error function $\mathrm{erf}(x)$ given by:

$$\frac{1}{2} \cdot \left( \mathrm{erf}\left( \frac{x+w}{\sqrt{2}\,\sigma} \right) - \mathrm{erf}\left( \frac{x-w}{\sqrt{2}\,\sigma} \right) \right).$$

9. The method of claim 1, further comprising, prior to said determining:
   comparing the VIP to a threshold; and
   identifying the peaks in the VIP based on the comparing.

10. An interactive input system, comprising:
   at least one imaging assembly capturing image frames of a region of interest; and
   processing structure in communication with the at least one imaging assembly, the processing structure being configured to:
      generate a vertical intensity profile (VIP) from a captured image frame, the VIP comprising peaks generally corresponding to locations of at least two pointers in the captured image frame; and
      determine if the peaks are closely spaced, and if the peaks are closely spaced to:
         fit a curve to the VIP by calculating a nonlinear least squares fit for at least one model, each model comprising at least two peaks, each peak having at least one of a respective peak location, a respective peak half-width and a respective peak amplitude, calculating a goodness-of-fit value for each model, and determining a final model by comparing the goodness-of-fit values, the final model being the fitted curve;

analyze the fitted curve to determine peak locations of the fitted curve;

register the determined peak locations as the pointer locations.

11. The system of claim 10, wherein the at least one imaging assembly comprises two or more imaging assemblies, the processing structure being further configured to carry out said generating and said determining for a respective image frame captured by each imaging assembly, and to:

calculate the positions of the at least two pointers by triangulation based on the pointer locations.

12. The system of claim 11, wherein if the peaks are determined not to be closely spaced, the processing structure is further configured to:

analyze the VIP to determine the peak locations; and register the determined peak locations as the pointer locations.

13. The system of claim 11, wherein the nonlinear least squares fit is calculated using one of a conjugate gradient algorithm, a Levenberg-Marquardt algorithm, and a nonlinear simplex algorithm.

14. The system of claim 11, wherein, during the fitting, the processing structure is further configured to:

calculate an Akaike Information Criterion (AIC) value for each model; and determine the final model by comparing the goodness-of-fit values and the AIC values.

15. The system of claim 14, wherein the final model determined is the model having at least one of a lowest goodness-of-fit value and a lowest AIC value.

16. The system of claim 15, wherein the processing structure is further configured to:

calculate a value of fit residuals for each model, wherein the AIC value for each model is calculated based on the value of the fit residuals.

17. The system of claim 11, wherein the at least one model is based on a point-by-point maximum of the VIP, the point-by-point maximum given by:

$$\max([f(x_o, w, \sigma), g(x_o, w, \sigma), h(x_o, w, \sigma), \ldots])$$

where $f(x, w, \sigma)$, $g(x, w, \sigma)$ and $h(x, w, \sigma)$ each represent an individual VIP function corresponding to a respective VIP peak, and where $x_o$ is the peak location and w is the half-width of each individual VIP function, and $\sigma$ is instrumental profile width.

18. The system of claim 17, wherein each VIP peak is proportional to an error function $\mathrm{erf}(x)$ given by:

$$\frac{1}{2} \cdot \left( \mathrm{erf}\left(\frac{x+w}{\sqrt{2}\,\sigma}\right) - \mathrm{erf}\left(\frac{x-w}{\sqrt{2}\,\sigma}\right) \right).$$

19. The system of claim 11, wherein the processing structure is further configured to, prior to the determining:

compare the VIP to a threshold; and identify the peaks in the VIP based on the comparing.

20. A non-transitory computer readable medium having embodied thereon a computer program for determining locations of at least two pointers in a captured image frame, the computer program comprising:

program code for generating a vertical intensity profile (VIP) from the captured image frame, the VIP comprising peaks generally corresponding to the at least two pointers; and program code for determining if the peaks are closely spaced and, if the peaks are closely spaced:

program code for fitting a curve to the VIP by calculating a nonlinear least squares fit for at least one model, each model comprising at least two peaks, each peak having at least one of a respective peak location, a respective peak half-width and a respective peak amplitude, calculating a goodness-of-fit value for each model and determining a final model by comparing the goodness-of-fit values, the final model being said fitted curve;

program code for analyzing the fitted curve to determine peak locations of the fitted curve; and program code for registering the determined peak locations as the pointer locations.

* * * * *